United States Patent [19]

Hvolka

[11] Patent Number: 5,120,182
[45] Date of Patent: Jun. 9, 1992

[54] MULTI-PURPOSE ARTICULATED BUCKET LIFT DIGGING AND HAULING VEHICLE

[76] Inventor: Dusan J. Hvolka, 419 Wakara Way, Ste. 209, Salt Lake City, Utah 84108

[21] Appl. No.: 577,155

[22] Filed: Sep. 4, 1990

Related U.S. Application Data

[63] Continuation-in-part of Ser. No. 359,278, May 31, 1989, abandoned, which is a continuation-in-part of Ser. No. 140,671, Jan. 4, 1988, abandoned.

[51] Int. Cl.$^5$ .............................................. B60P 1/04
[52] U.S. Cl. .................................... 414/487; 414/491; 414/551; 180/134; 180/65.5; 37/4; 37/118 A; 37/DIG. 14; 37/DIG. 15; 37/DIG. 20
[58] Field of Search ............... 414/419, 420, 459, 460, 414/469, 472, 485, 487, 491, 492, 493, 501, 521, 551, 554, 565, 566, 749, 916; 180/11, 89.1, 234, 235, 311, 312, 317, 904, 134; 37/118 A, 118 R, 126 A, 126 AA, 126 AB, 126 AC, 126 AD, 126 AE, 126 R, 124, DIG. 5, DIG. 15, DIG. 18; 901/47

[56] References Cited

U.S. PATENT DOCUMENTS

| | | | |
|---|---|---|---|
| 1,891,266 | 12/1932 | Le Tourneau | 37/126 AD |
| 2,654,165 | 10/1953 | Lichtenberg | 37/126 AD |
| 2,679,119 | 5/1954 | Robb | 37/DIG. 5 X |
| 2,795,872 | 6/1957 | Wardle | 414/492 X |
| 3,235,983 | 2/1966 | Wilson | 414/493 X |
| 3,520,432 | 7/1970 | Muotka et al. | 414/487 |
| 3,826,387 | 7/1974 | Galis | 414/551 |
| 3,877,717 | 4/1975 | Swoager | 280/666 |
| 3,937,345 | 2/1976 | Countryman | 414/492 |
| 4,249,629 | 2/1981 | Hutt | 280/400 X |
| 4,505,632 | 3/1985 | Quenzi | 414/551 X |

FOREIGN PATENT DOCUMENTS

| | | | |
|---|---|---|---|
| 0125952 | 6/1987 | Japan | 180/234 |
| 1059656 | 2/1967 | United Kingdom | 414/565 |

*Primary Examiner*—David A. Bucci
*Assistant Examiner*—James Keenan
*Attorney, Agent, or Firm*—Marcus G. Theodore

[57] ABSTRACT

An articulated U-shaped multi-purpose vehicle particularly adapted for underground digging and hauling comprising: a U-shaped frame having opposing sides and front ends connected by a front piece, and rear ends defining an open interior space in communication with an open front end; a bucket load chamber mounted within the U-shaped frame, a liftable bucket loader hingedly attached to the frame to pivotally tilt the bucket loader bottom as it is rearwardly lifted and transported to empty its contents into the bucket load chamber, wheel mounts capable of pivoting attached to the opposing sides; a plurality of wheels independently suspended and rotatably attached to the wheel mounts; pivots associated with the wheel mounts to pivot and turn each wheel in a desired direction; a motor associated with each wheel to rotate the wheels forward and backward; a power source operably associated with the pivots and motors; and controls mounted to the frame and associated with the engine, pivots, and power source is selectively activate the engine and pivots to align and drive each wheel at the desired speed and direction.

9 Claims, 2 Drawing Sheets

MULTI-PURPOSE ARTICULATED BUCKET LIFT DIGGING AND HAULING VEHICLE

RELATED APPLICATIONS

This application is a continuation-in-part application of the continuation-in-part application entitled Multi-Purpose Digging and Hauling Vehicle, Ser. No. 359,278, filed May 31, 1989 of the originally filed application: U.S. patent application Ser. No. 07/140,671, filed Jan. 4, 1988 entitled "Multi-Purpose Vehicle", both now abandoned.

BACKGROUND OF THE INVENTION

1. Field

This invention relates to multi-purpose vehicles. Specifically, it relates to an improved light weight, highly efficient multi-purpose vehicle particularly adapted for underground digging and hauling applications.

2. State of the Art

Numerous multi-purpose vehicles are known. These vehicles typically employ an X-shaped, or box-shaped frame with a conventional cab on the front, and a cabin or bed attached along the length of the frame, such as the amphibious vehicle designed by Fletcher et al, U.S. Pat. No. 2,923,268. Generally, the conventional multi-purpose vehicle has forward steering wheels and rear drive wheels. When pulling heavy objects, a number of conventional vehicles may be harnessed together in series. This requires a long pulling space to accommodate the aligned vehicles connected in series. These harnessed vehicles are also difficult to turn and cause the rear vehicles to run in the tracks left by the forward vehicles; often times resulting in poor traction of the trailing vehicles. The aligned vehicles, when harnessed, generally move in a longitudinal direction. Non-pivoting wheels of conventional vehicles do not allow significant sideward movement, which makes it necessary to uncouple and recouple the vehicles where it is necessary to move the load laterally.

To shorten the turning radius of conventional vehicles, articulated vehicles, such as those described in Hutt, U.S. Pat. No. 4,249,629, and Domenighetti, U.S. Pat. No. 3,914,065 have been utilized. In other applications, a series of carts pulled by a main drive vehicle may be employed, such as the Fire Fighting and Rescue Apparatus described by P. F. Cummins, U.S. Pat. No. 3,169,581. Although these articulated vehicles enable a series of harnessed vehicles to turn in a shorter radius, they do not solve the problem of the rear aligned vehicle's poorer traction as it travels in the same tracks left by the forward vehicles.

The confined working space in underground mines also requires compactness in self loading hauler (SLH) vehicle designs. As a result, SLH vehicles tend to have a length slightly greater than a light hauling design vehicle, with a length greater than the combined width and height of the vehicle. The excessive length is tolerable in a majority of underground operations since the drifts (tunnels) are long in comparison and have a narrow width and low height. The excessive length of the SLH contributes to counter-balancing the oversized payloads. However, the narrow width complicates turning and side slope stability. This requires judicious design of the basic frame structure and the location of the components within it. Low height is not only desirable from an operating stand-point, but is also necessary in order to improve the stability of the SLH.

Applicant's invention described below provides an efficient ergonomically designed SLH vehicle with a centrally located operator station. It has independent wheel drive and suspension which can move laterally, if desired, for greater mobility.

British Patent 1,203,338 incorporates a conveyor assembly running the length of the bed. It therefore is of a box-like shape rather than a U-shaped vehicle which can nest or interconnect for pulling and pushing articles. British Patent No. 1,059,656 uses a flexible articulated frame shown in FIG. 5, which lifts and bends during lifting to scoop earth. British Patent No. 1,059,656 also incorporates a conveyor system into its bed for materials handling and movement.

Muotka et al, U.S. Pat. No. 3,520,432 utilizes a box frame which requires a Blade 4 to rearwardly transport materials to the rear of the bed. Quenzi, U.S. Pat. No. 4,505,638 is another example of a box frame, utilizing a horizontal pair of tracks along which its bucket travels. This loading movement of the bucket action differs from applicant's as described below.

Moehr, U.S. Pat. No. 3,306,478 is another example of a low profile, self-loading hauling and dumping vehicle. Kress, U.S. Pat. No. 4,026,430 is a mobile carrier for large scrap steel carrying boxes. Wardle, U.S. Pat. No. 2,795,872 is a carry-all with claw loading scraper apron to assist in loading. Wilson, U.S. Pat. No. 3,235,983 is another earth moving apparatus. Galis, U.S. Pat. No. 3,826,387 is a self loading and self-propelled haulage vehicle. Niva, U.S. Pat. No. 4,556,356 is a U-frame truck for handling and transportation of containers or receptacles. Robb, U.S. Pat. No. 2,679,119 discloses an auxiliary scraper and loading apron. Bodine, U.S. Pat. No. 3,030,715 discloses a sonic wave earth digging and moving machine. Trieschmann, U.S. Pat. No. 3,273,732 is a self-loading vehicle and dump gate therefore. Le Tourneau, U.S. Pat. No. 1,891,266 discloses a scraper. Lichtenberg, U.S. Pat. No. 2,654,165 discloses a carry-type scraper with front digger moving means. Countryman, U.S. Pat. No. 3,937,345 is a shovel loader with ejector bucket. Shackley, Canadian Patent No. 681,266 is a vehicle provided with a dragline loader. Cited for general interest is Cohen, U.S. Pat. No. 4,065,825, and Nishibori, Japan No. 62-125952 showing an all wheel independent steering gear.

SUMMARY OF THE INVENTION

Applicant's invention comprises a multi-purpose digging and hauling vehicle having a U-shaped frame. It has a uni-body U-shaped digging system component having a uni-body U-shaped digging frame with front, back, and opposing sides. An open top bucket load chamber is tiltably mounted to the frame. The bucket load chamber has opposing sides attached to a bed, with rear side ends connected by a back piece, and front ends defining an opening leading into an interior load carrying space of the chamber. For use in underground hauling, the chamber sides and back are sloped to aid in emptying loads from the bucket load chamber, when tilted. Wheel mounts are attached to the opposing sides, and a plurality of wheels are then independently suspended and rotatably attached to the wheel mounts. A bucket loader having a bottom and sides defining an open top scoop with open ends in communication with the bucket load chamber is attached to the frame. The lip of the bottom is sharpened to dig and scoop earth, ore, and the like into said bucket loader.

Transfer means to transfer the contents of the bucket loader into the bucket load chamber are structured as lugs attached to the exterior of the sides of the bucket loader. These lugs are slideably mounted within parallel arched grooved tracks in the sides of the bucket load chamber which travel upward and rearward along the bucket load chamber opening and top. As the lugs travel along the tracks, the bucket loader is rearwardly transported and tilted to empty its contents through the rear of the bucket loader into the bucket load chamber. Lifting means are operably associated with the bucket loader to move the bucket loader along the grooved tracks to tilt and empty the bucket loader.

Dumping means are operably associated with the frame and bucket load chamber to selectively lift and tilt the bottom of the bucket load chamber to unload the contents of said chamber through the open end of the bucket loader in one mode, and to lower and ready the bucket load chamber for receipt of materials in the other mode.

A three point hinge connecting articulation system having a first joint is attached to the back of the digging frame.

A drive system component having a frame with front, back, and sides having a second joint is then hingedly attached to the first joint. The drive system component preferably has a cab mounted near the front of the frame, and is sized to accommodate an operator. It also has at least one door opening for the operator to enter and exit the cab.

Wheel mounts are attached to the sides of the frame via pivot means to pivot and turn each wheel in a desired direction. Preferably the wheels are also independently suspended.

An engine mounted toward the rear of the frame drives the wheels and pivot means to rotate said wheels forward or backward, Control means, such as a control panel, are mounted within the cab. A secondary power source, such as a generator or battery is operably associated with the control panel to selectively operate the pivot means, control means, tilting means, and bucket loader of the multi-purpose vehicle.

Various types of conventional pivot means may be attached to the wheel mounts to allow each pivot to independently turn in a desired direction for independent steering. Preferably, each wheel also has an independent drive motor associated with it to rotate said wheel in a forward or rearward direction, giving the vehicle wide directional steering latitude.

Preferably the drive motors are preset to run at their optimal efficiency points. A variable speed transmission, such as that described in U.S. Pat. No. 4,856,378, entitled "Variable Speed Transmission", may then be included in the drive train to provide the desired speed and torque to each wheel.

The bucket loader preferably has sides which define a narrowing opening from front to back to concentrate materials scooped up by the front end of the bucket loader for discharge through its open rear end. When adapted as a self loading hauler (SLH), the bucket system is open ended to channel scooped materials rearward through the open rear end of the bucket into a carrying bed.

The preferred bucket loader design has an open front scoop with a sloped bottom structured such that the front blade edge of the scoop is wider than the rear edge of the scoop. The bottom has vertical sloping sidewalls attached to channel material received from the front to the scoop through the rear of the scoop into a carrying bed. The weight of the material and its friction forces on the bucket lip and walls act against the movement of the material. The rock in the pile includes course particle material of various sizes. The required effort exerted by the loading head (bucket) is determined by the depth of penetration, the length of the blade (width of the bucket) and the slope of the penetrating plane of the blade.

The SLH bucket loader blade edge acts like a wedge when penetrating a rock pile. The force resisting this wedging action is usually greater than the other frictional forces and is difficult to estimate. As a wedge penetrates loose rock, the rock in the vicinity of the wedge is compacted, exerting pressure on the wedge faces. As a first approximation, the normal pressure on the wedge face is assumed to be a linear function of depth of penetration. The resistance to penetration—a combination of the axial components of the normal and frictional forces—is then proportional to the square of the penetration depth. Besides compaction, shear forces are generated in the medium. When the shear forces along a certain surface within the rock medium exceed the frictional resistance, a part of the rock medium will move relative to the bulk of the rock along that surface, assuming that the loose rock is cohesionless, and the resistance to relative motion between rock particles is due to friction. The resistance to penetration will be reduced, especially if the sheared portion is removed and the penetration cycle will start all over from the newly exposed surface.

If the rock medium is confined on both sides, and the boundaries of the shear source and compaction region do not reach the free surface, then the rock within the region of compaction will experience greater compaction than in the semi-infinite case. The resistance to wedge penetration will also be greater. In other words, for the same penetration force, the depth of penetration will be less than when the rock is unconfined.

For two parallel wedges, such as the side edges of a digging bucket, the compaction of the rock between the wedges provides the most significant factor in resistance to penetration. Each wedge not only compacts the rock within its own area of influence, but also acts as a confinement relative to the other wedge. If the two compaction regions overlap, the compaction is increased, so is the resistance to penetration. If the potential shear surfaces overlap, then shearing will be prevented. There will be no relief from displacement of the sheared rock volume. All of these factors contribute to the increase in penetration resistance.

To reduce resistance to wedge penetration for improved digging and loading head bucket design, the above analysis shows that resistance to wedge penetration is mainly due to compaction of loose rock. This resistance is especially pronounced when there are two parallel wedges close to each other. In order to increase loading head penetration, the wedge angle of the bucket sidewalls is decreased from parallel to form a tapered shaped bucket having a wide opening gradually narrowed by the sidewalls forming a channel to concentrate materials as they travel rearward. The throat width of the bucket sidewalls is also selected to insure that the sidewalls do not provide compaction resistance to penetration within the tapering section of the loading head. Preferably, the loading head is enclosed on three sides—the bottom and two side walls-while the rock pile surface on top is free.

To further reduce confinement and compaction of the material scooped by the loading head, the sidewalls can be designed to slant upwards and outwards instead of being vertical. This allows the rock to move upwards, reducing the compaction and resistance to penetration by providing an opportunity for the rock to move in a direction other than towards one another. This takes advantage of the loading head's free top surface.

Positioning means, such as a positioning cylinder, are associated with the frame and bucket loader to enable the operator to initially set the optimal digging angle of the digging edge, given the uneven floor of the gullies.

The drive component provides tractive means to provide forward movement to the digging edge to penetrate a pile.

Applicant's multi-purpose articulated digging vehicle apparatus described above provides a highly efficient digging system resulting in optimization of vehicle digging forces which include lighter weight vehicles, increased travel speed, acceleration, and tractive forces from smaller engines and vehicles. Significant improvements in the horsepower to empty vehicle weight ratios for digging conditions and horsepower to gross vehicle width ratios for tramming conditions therefore result.

To dump the bucket loading chamber, dumping means, such as dump cylinders with one end attached to the U-frame and the other end attached to the bottom of the bucket load chamber selectively raise and tilt the bucket load chamber to the dump position. In the first mode, the dumping means selectively lift and vertically tilt the bottom of the bucket load chamber to unload said chamber through the open end of the bucket loader. After emptying, the dumping means then lower the bucket load chamber for receipt of materials in the second mode. The bucket functions as an open tailgate when in the first mode. The bucket is then selectively lowered so that additional material may be carried in the bucket after the bucket load chamber is filled for hauling in the second mode.

Towards the rear of the U-frame, a cab is mounted to position the operator in view of the gully cleaning operations. The cab is sized to accommodate the operator, and includes at least one door opening for the operator to enter and exit the cab.

Wheel mounts are then attached to the sides of the drive frame. Conventional pivot means, are associated with the wheel mounts to pivot and turn each wheel mount up to 25 degrees in a desired direction. A plurality of wheels are then independently suspended and rotatably attached to the wheel mounts via conventional mounts.

Drive means, such as an internal combustion engine utilizing hydrostatic wheel drive, are mounted on top and towards the rear of the U-frame beneath the cab. The engine is operably associated with the wheels via a conventional transmission drive train to rotate the wheels forward or backward.

Control means—i.e. a control panel mounted within the cab-are operably associated with the transmission to control the output from the drive means, and the speed of the wheels. The control panel also controls the pivot means to selectively align each wheel in the desired direction.

An auxiliary power source, such as a hydraulic system, is also controlled by the control panel to selectively operate the tilting means, and bucket loader.

The type of transfer means required to empty the bucket loader into the bucket load chamber is dependent upon the type of material typically encountered. For example, if loose material is being loaded, the preferred transfer means utilizes a bucket loader which is vertically lifted rearward and simultaneously tilted to empty the contents of the bucket into the bucket load chamber. This is accomplished by attaching guides to the rear exterior of the bucket loader. The guides are slideably mounted to run along arched tracks running along both front and top exterior sides of the bucket load chamber. The tracks are arched and aligned to travel upward and rearward. A drive piston has one end attached above the track and the other end attached to the bucket loader to force the bucket loader rearward when activated. As the bucket loader is forced rearward, it is simultaneously lifted in an arc, and the bottom of the bucket loader tilted as the guides travel along the tracks to transport and empty the contents of the bucket loader through its open rear end into the load chamber.

After the bucket load chamber is filled, the bucket loader is lowered and also filled to carry additional material. The operator then drives the loaded SLH vehicle to the dump site. At the dump site, the dumping means are activated by the control panel to raise and incline the bucket load chamber and bucket loader to empty their contents through the open front of the bucket loader.

Another preferred embodiment of transfer means for handling loose material has the bottom of the bucket loader hingedly attached to the front of the frame. After loading, the bucket loader is then pivoted and tilted with a drive piston to rearwardly transport and empty the contents of the bucket loader into the bucket load chamber. The loaded SLH vehicle is then driven to the dump site and emptied in the manner described above.

In underground mining or other areas with contaminated air systems, the SLH vehicle may be operated by remote control. The SLH vehicle is adapted with revolving electronic viewing means, such as a remote control operated capable of receiving and transmitting picture signals. Picture signals are then transmitted to the remote receiver viewing screen via a transmitter. A remote vehicle control system in communication with the control panel is then included to enable an operator to transmit signals to position and operate the vehicle from a distance.

To provide greater mobility and directional steering latitude, the SLH vehicle includes separate independent drive motors and steering means for each wheel. Either electrical or internal combustion engines drive motors may be utilized, depending upon fuel supply, availability, and cost.

Preferably the drive motors are present to run at their optimal efficiency levels. A variable speed transmission, such as that described above, is then included in each drive train to provide the desired speed and torque outputs to operate the drive wheels.

Wheel mounts are attached to the opposing sides of the digging system frame. A plurality of wheels are then independently suspended and rotatably attached to the wheel mounts.

The drive system component may comprise a multi-purpose U-shped drive vehicle similar to that described in the co-pending Multi-Purpose Service Vehicle, Ser. No. 568,767 filed Aug. 17, 1990 with, or without, the loading system mounted on top of the drive frame. A corresponding rear mount is attached to the front of the drive frame and interconnected with the front mount to provide articulated joinder of the digging system and the drive system. The front and rear mounts have three interconnecting hinges to provide added stability and prevent twisting. In one preferred embodiment, the front frame has both ends of the drive frame angled to accommodate the digging system frame and enable the articulated joint to bend more; thus providing a shorter turning radius.

Preferably, the front of the drive frame has both ends of the drive frame angled to accommodate the digging system frame and enable the articulated joint to bend more; again, providing a shorter turning radius.

Towards the front of the drive frame, a cab is mounted to mid-position the operator for a better view of the gully cleaning operations. The cab is sized to accommodate the operator, and includes at least one door opening for the operator to enter and exit the cab.

Similar wheel mounts are then attached to the sides of the drive frame with pivot means associated with the wheel mounts to pivot and turn each wheel mount up to 360 degrees in a desired direction. A plurality of wheels are then independently suspended and rotatably attached to the wheel mounts as described above.

As adapted, applicant's improved articulated bucket lift digging and hauling vehicle thus provides an ergonomically improved vehicle particularly suited for underground mining, digging, and hauling operations.

DESCRIPTION OF THE ILLUSTRATED EMBODIMENTS

Figure 1:
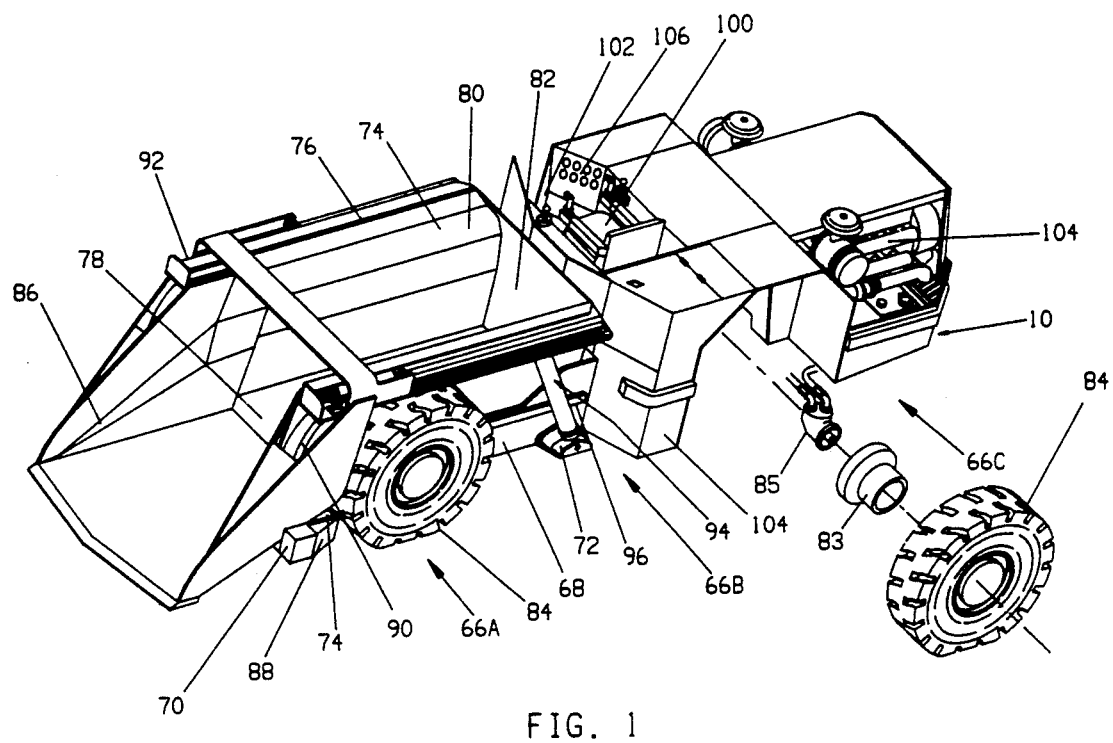
FIG. 1 illustrates a perspective view of a preferred embodiment of applicant's invention.

FIG. 1 illustrates a preferred embodiment of applicant's articulated self loading hauler system vehicle 10 utilizing a conventional driving system component 66C. The digging system component 66A has a digging frame 68 with front 70, back 72, and sides 74. A U-shaped open top bucket load chamber 76 is tiltably attached to the digging frame 68, via the dumping system described below and shown in FIG. 3. The opposing sides 74 of the bucket load chamber 76 are attached to a bed 78. The rear side ends 80 are connected by a back piece 82 to form an open topped U-shaped carrier having a frontal opening leading into the interior load carrying space of the bucket load chamber 76. Preferably, the sides 74 and back piece 82 are sloped as shown in FIG. 1 to aid in emptying loads.

Wheel mounts, not shown, are attached to the opposing sides 74 of the digging frame 68. A plurality of wheels 84 are then independently suspended and rotatably attached to the hydrostatic wheel drive 83, and driven by the wheel motor 85.

Figure 2:
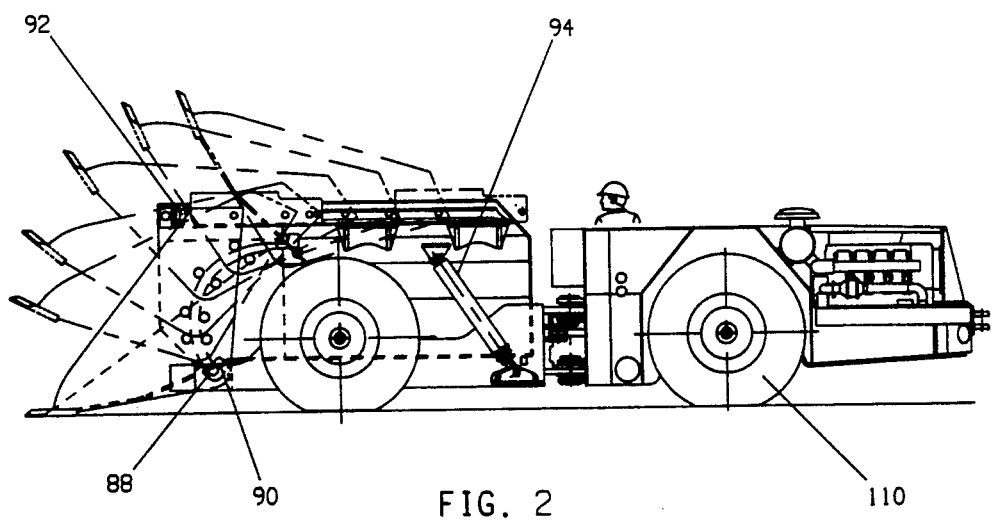
FIG. 2 illustrates a side view of the embodiment shown in FIG. 1.

As shown in FIG. 2, a bucket loader 86 is liftably associated with the sides 74 of the bucket load chamber 76 with guides 88 shown in FIG. 1 attached to the exterior of the bucket loader 86 to vertically lift rearward and simultaneously tilt the bucket loader 86 to empty its contents into the bucket load chamber 76. This is accomplished by slideably mounting the guides 88 to run along arched tracks 90 running along both front and top exterior sides 74 of the bucket load chamber 76. The tracks 90, shown in FIG. 1, are arched and aligned to travel upward and rearward. Dual drive pistons 92 shown have one end attached to each front of the bucket load chamber 76 above the tracks 90 and the other end attached to the sides of the bucket loader 86 to force and lift the bucket loader 86 rearward in an arc when activated. The bucket loader bottom is simultaneously tilted as the guides 88 travel along the tracks 90 to transport and empty the contents of the bucket loader 86 through its open rear end into the load chamber 76.

Figure 3:
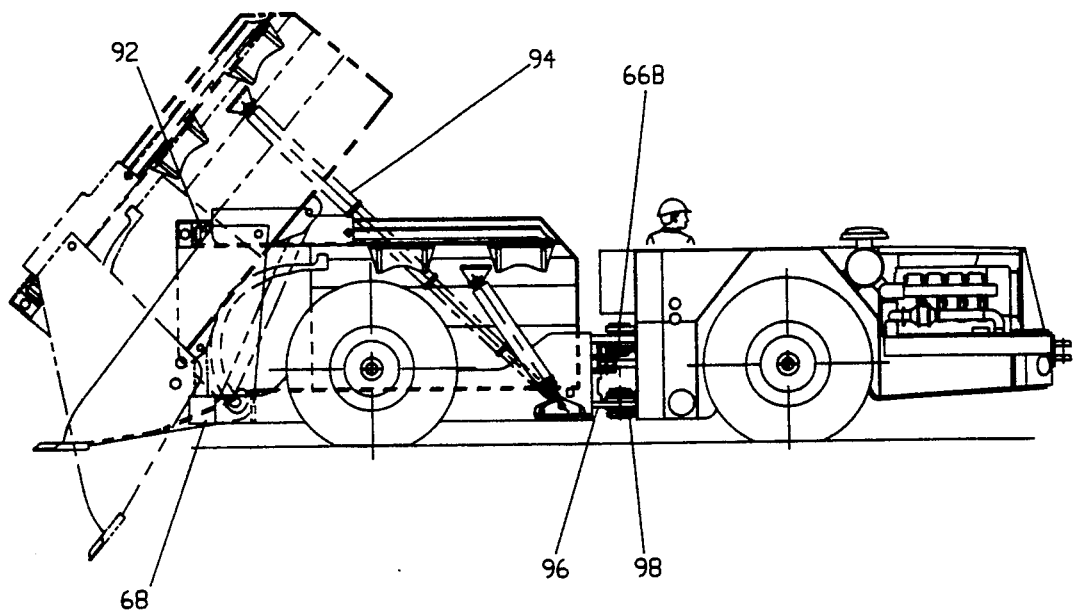
FIG. 3 illustrates another side view of the embodiment shown in FIG. 1

To dump the bucket load chamber 76, a dump cylinder 94 with one end attached to the digging frame 68 and the other end attached to the bottom of the bucket load chamber 76, selectively raises and tilts the bucket load chamber 76 for dumping, as shown in FIG. 3. After emptying, the dump cylinder 94 then lowers the bucket load chamber 76 to the load position to receive materials.

The three point hinge connecting articulation system 66B with hinged front and rear mounts 96,98 has the front mount 96 attached to the back of the digging system frame 68 to connect the digging system 66A to the drive system 66C.

The drive frame of the drive system 66C has angled ends to accommodate the digging system frame 66A and enable the articulated joint 66B to bend more; thus providing a shorter turning radius.

Towards the front of the drive system 66C is a cab 100 to mid-position an operator for centralized control of the gully cleaning operations. The cab 100 is sized to accommodate the operator, and has a door opening 102 for the operator to enter and exit the cab 100. A remote control camera, not shown, may be mounted near the cab to transmit picture signals for remote operation of the vehicle.

An internal combustion engine power source 104 utilizing hydrostatic wheel drive 85 separately drives the wheels via a wheel motor 83.

Control means such as a control panel 106 in the cab 100 is operably associated with the transmission, engine 104, and wheel pivot means to control and drive the vehicle via a wheel end drive unit 83.

An hydraulic system (not shown), is associated with the hydraulic pistons 92, 94 and also controlled by the control panel 106 to selectively operate the bucket loader 86 and bucket load chamber 76.

Figure 4:
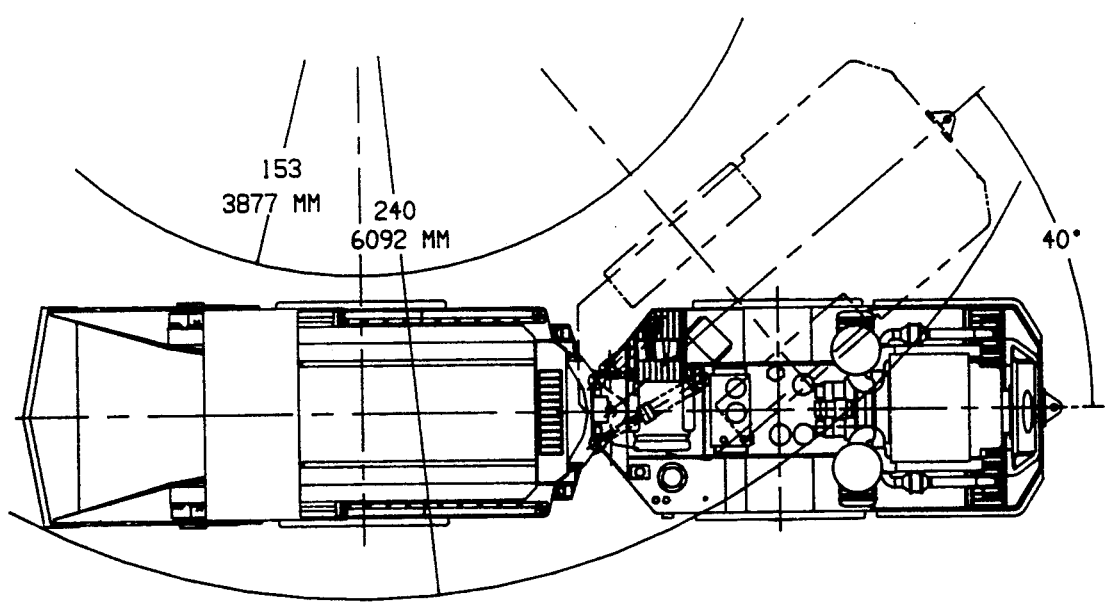
FIG. 4 illustrates a top view of the embodiment shown in FIG. 1.

FIG. 4 is a top view of the vehicle 10 showing the turning radius.

The length of the vehicle 10 is longer than its combined width and height. This enables the vehicle 10 to work in confined working spaces, such as underground mines.

Although this specification has made reference to the specific embodiments, it is not intended to restrict the scope of the appended claims. The claims themselves recite those features deemed essential to the invention.

I claim:

1. An articulated multi-purpose vehicle for digging and hauling, comprising:
   I. a driving system component having:
      a. a frame having sides, b. wheel mounts capable of pivoting attached to opposing sides of the frame, c. a plurality of wheels independently suspended and rotatably attached to the wheel mounts, d. pivot means associated with the wheel mounts to pivot and turn each wheel in a desired direction, e. independent drive means associated with each wheel to rotate said wheels forward and backward, f. a power source to operate the pivot means and independent drive means, g. control means mounted to the frame and associated with the drive means and pivot means to selectively activate the drive means and pivot means to align and drive each wheel at a desired speed and direction, h. a cab attached to a front piece sized to accommodate an operator and the control means, and having a door through which the operator may enter and exit the cab, and at least one window through which the operator may view the environs surrounding the vehicle, ii. an articulated hinged joint attached to the frame of the driving component; and iii. a digging system component having:

a. a U-shaped digging frame with a back, and opposing sides connected to the back to define an open interior space in communication with an open front end of sufficient size and width to accommodate various types of carrying beds, b. a corresponding hinged articulated joint attached to the back of the digging frame and operably associated with the articulated joint to connect the driving component with the digging component;

c. an open top bucket load chamber tiltably mounted to the frame, having opposing sides attached to a bed, with rear side ends connected by a back piece, and front ends defining an opening leading into an interior load carrying space of the chamber, d. wheel mounts attached to the opposing sides, e. a plurality of wheels independently suspended and rotatably attached to the wheel mounts, f. a bucket loader having a bottom and sides defining an open top scoop with open ends and the forward open end of the bottom sharpened to dig and scoop materials into said bucket loader; said bucket loader hingedly attached to the frame with positioning structure to hold said bucket loader at a desired angle to load and unload material into said bucket loader;

g. transfer means hingedly attached to the bottom of the bucket loader and to the front of the frame to pivot and tilt rearward the bottom of the bucket loader to transport and empty its contents into the bucket load chamber, having;

(i) a pair of arched aligned parallel tracks running along an exterior of each side of the bucket load chamber which travel upward and rearward starting at the bottom of the front opening and running upward along the front opening until reaching the top and then rearward along the length of the top of the bucket load chamber, (ii) guides attached to the rear exterior sides of the bucket loader proximate the bucket load chamber, and slideably mounted to run along the parallel tracks, and (iii) a pair of drive pistons associated with each guide to force the guides along the tracks carrying the bucket loader upward and rearward along the tracks, when activated, and simultaneously lifting and tilting the bottom of the bucket loader rearwardly in an arc to empty the contents of the bucket loader through its open rear into the load chamber to transfer the contents of the bucket loader into the bucket load chamber, h. tilting means attached to the bucket loader to tilt the bucket loader rearward for unloading in a first mode and to return the bucket loader for loading in a second mode, I. dumping means operable associated with the frame and bucket load chamber to selectively lift and tilt the bottom of the bucket loader chamber to unload the contents of said chamber through the open end of the bucket loader in a first mode, and to lower and ready the bucket load chamber for receipt of materials in a second mode, and j. secondary power means operably associated with the control panel and dumping and transfer means to enable the operator to selectively load and unload the bucket loader.

2. An articulated multi-purpose vehicle for digging and hauling, comprising:

a. a uni-body U-shaped digging system component having:

I. a uni-body U-shaped digging frame with front, back, and opposing sides,

II. an open top bucket load chamber tiltably mounted to the frame, having opposing sides attached to a bed, with rear side ends connected by a back piece, and front ends defining an opening leading into an interior load carrying space of the chamber, iii. wheel mounts attached to the opposing sides, iv. a plurality of wheels independently suspended and rotatably attached to the wheel mounts, v. a bucket loader having a bottom and sides defining an open top scoop with open ends the forward open end of the bottom sharpened to dig and scoop earth and ore into said bucket loader;

vi. transfer means hingedly attached to the bottom of the bucket loader and associated with the the frame to pivotally tilt the bucket loader bottom as it is rearwardly lifted and transported to empty its contents into the bucket load chamber, having;

(1) a pair of arched aligned parallel tracks running along an exterior of each side of the bucket load chamber which travel upward and rearward starting at the bottom of the front opening and running upward along the front opening until reaching the top and then rearward along the length of the top of the bucket load chamber, (2) guides attached to the rear exterior sides of the bucket loader proximate the bucket load chamber, and slideably mounted to run along the parallel tracks, and (3) a pair of drive pistons associated with each guide to force the guides along the tracks carrying the bucket loader upward and rearward along the tracks, when activated, and simultaneously lifting and tilting the bottom of the bucket loader rearwardly in an arc to empty the contents of the bucket loader through its open rear end into the load chamber to transfer the contents of the bucket loader into the bucket load chamber, vii. dumping means operable associated with the frame and bucket load chamber to selectively lift and tilt the bottom of the bucket load chamber to unload the contents of said chamber through the open end of the bucket loader in a first mode, and to lower and ready the bucket load chamber for receipt of materials in a second mode, and viii. a three point connecting articulation system having a first joint attached to the back of the digging frame; and b. a drive system component having:
  i. a frame with front, back, and sides,
  ii. a cab mounted near the front of the frame, said cab sized to accommodate an operator, with at least one door opening for the operator to enter and exit the cab,
  iii. wheel mounts attached to the sides of the frame,
  iv. pivot means associated with the wheel mounts to pivot and turn each wheel mount in a desired direction,
  v. a plurality of wheels independently suspended and rotatably attached to the wheel mounts,
  vi. an engine mounted toward the rear of the frame and operably associated with the wheels to rotate said wheels forward or backward,
  vii. control means mounted within the cab and operably associated with the drive means, and pivot means to selectively activate the drive means and pivot means to align and drive each wheel at the desired speed and direction,
  viii. a power source to selectively operate the pivot means, control means, tilting means, and bucket loader of the multi-purpose vehicle, and
  ix. a corresponding articulation joint associated with the first articulation joint to articulately connect the loading system component to the driving system component.

3. An articulated multi-purpose vehicle according to claim 2, wherein the transfer means to empty the bucket loader, comprises:
  i. lugs attached to the exterior of the sides of the bucket loader and slideably mounted within parallel arched grooved tracks in the sides of the bucket load chamber which travel upward and rearward along the bucket load chamber opening and top to rearwardly transport and tilt the bucket loader to empty its contents through the rear of the bucket loader into the bucket load chamber as the lugs move along the grooved tracks, and
  ii. lifting means operably associated with the bucket loader to move the bucket loader along the grooved tracks to tilt and empty the bucket loader.

4. An articulated multi-purpose vehicle according to claim 2, wherein the drive means comprises hydrostatic wheel drive.

5. An articulated multi-purpose vehicle according to claim 2, wherein the length of the vehicle is longer that its combined width and height.

6. An articulated multi-purpose vehicle according to claim 2, wherein the dumping means comprises a dump cylinder with one end attached to the digging frame and the other end attached to the bottom of the bucket load chamber to selectively raise and tilt the bucket load chamber to a dump position with the bucket functioning as an open tailgate when in a dump mode, and to selectively lower and level the bucket load chamber to a load position with the bucket loader functioning as a hauler, when positioned in a loading mode.

7. An articulated multi-purpose vehicle according to claim 2, wherein the drive means and power source comprise at least one internal combustion engine having a fuel supply associated with each wheel.

8. An articulated multi-purpose vehicle according to claim 2, wherein the drive means and power source comprise at least one electric motor having an electric power source associated with each wheel.

9. An articulated multi-purpose vehicle according to claim 2, wherein the wheels are independently suspended and rotatably attached to the wheel mounts, and including independent drive means associated with each drive wheel to rotate said wheels forward or backward.

* * * * *